(12) United States Patent
McLoughlin et al.

(10) Patent No.: US 12,465,045 B2
(45) Date of Patent: Nov. 11, 2025

(54) LUNG PERFUSION SOLUTION, AND USE THEREOF FOR THE EX-VIVO PRESERVATION OF A MAMMALIAN LUNG

(71) Applicant: UNIVERSITY COLLEGE DUBLIN, NATIONAL UNIVERSITY OF IRELAND, DUBLIN, Dublin (IE)

(72) Inventors: Paul McLoughlin, County Dublin (IE); Simon Coyle Rowan, Dublin (IE)

(73) Assignee: UNIVERSITY COLLEGE DUBLIN, NATIONAL UNIVERSITY OF IRELAND, DUBLIN, Dublin (IE)

( * ) Notice: Subject to any disclaimer, the term of this patent is extended or adjusted under 35 U.S.C. 154(b) by 454 days.

(21) Appl. No.: 17/541,511

(22) Filed: Dec. 3, 2021

(65) Prior Publication Data

US 2022/0338464 A1 Oct. 27, 2022

Related U.S. Application Data

(63) Continuation of application No. 15/564,703, filed as application No. PCT/EP2016/057846 on Apr. 8, 2016, now abandoned.

(30) Foreign Application Priority Data

Apr. 8, 2015 (GB) ...................... 1505987

(51) Int. Cl.
    *A01N 1/165* (2025.01)
    *A01N 1/126* (2025.01)
    *A01N 1/143* (2025.01)

(52) U.S. Cl.
    CPC ............. *A01N 1/126* (2025.01); *A01N 1/165* (2025.01); *A01N 1/143* (2025.01)

(58) Field of Classification Search
    CPC .... A01N 1/0226; A01N 1/0247; A01N 1/165; A01N 1/143
    See application file for complete search history.

(56) References Cited

U.S. PATENT DOCUMENTS

| | | |
|---|---|---|
| 5,370,989 A | 12/1994 | Stern et al. |
| 9,809,798 B2 | 11/2017 | Raghunath et al. |
| 2009/0263780 A1 | 10/2009 | Wang |
| 2014/0004046 A1* | 1/2014 | Raghunath ........... C12N 5/0692 435/395 |

FOREIGN PATENT DOCUMENTS

| | | |
|---|---|---|
| EP | 1997374 A2 | 12/2008 |
| WO | 02/35929 A1 | 5/2002 |
| WO | 02/49653 A1 | 6/2002 |
| WO | 2012/142487 A1 | 10/2012 |

OTHER PUBLICATIONS

Tothova et al. Intrinsic viscosity of PVP polymers in extremely diluted solutions. e-Polymers. 2013;13(1):1-6.*
Bando et al., "Comparison of Euro-Collins Solution, Low-Potassium Dextran Solution Containing Glucose, and ET-Kyoto Solution for Lung Preservation in an Extracorporeal Rat Lung Perfusion Model", European Surgical Research 30:297-304 (1998).
Cahill et al., "Gremlin Plays a Key Role in the Pathogenesis of Pulmonary Hypertension", Circulation 125:920-930 (2012).
Loichot et al., "Shear stress modulates vasopressin-induced renal vasoconstriction in rats", Naunyn-Schmiedeberg's Archives of Pharmacology 366:555-561 (2002).
Medical Device: Steen Solution, "Consultation procedure Public Assessment Report (CPAR): Consultation on an ancillary medicinal substance incorporated in a medical device", European Medicines Agency—Science Medicines Health (2012). (20 pages).
Post et al., "Optimal Flow and Pressure Management in Machine Perfusion Systems for Organ Preservation", Annals of Biomedical Engineering 40(12):2698-2707 (2012).
Roman et al., "Ex Vivo Lung Perfusion: A Comprehensive Review of the Development and Exploration of Future Trends", Transplantation 96(6):509-518 (2013).
Xvivo Perfusion, "Perfadex—The Gold Standard in Lung Preservation", (2016). (2 pages).
Yoo et al., "Optimization of isolated perfused/ventilated mouse lung to study hypoxic pulmonary vasoconstriction", Pulmonary Circulation 3(2):396-405 (2013).
Zhao et al., "NPR-A-Deficient Mice Show Increased Susceptibility to Hypoxia-Induced Pulmonary Hypertension", Circulation 99:605-607 (1999).
Exhibit A: Yao et al. "Animal-cell culture media: History, characteristics, and current issues" Reproductive Medicine Biology 16(2): 99-117 (2017).
Exhibit B: Kirikae et al. "Endotoxin contamination in fetal bovine serum and its influence on tumor necrosis factor production by macrophage-like cells J774. 1 cultured in the presence of the serum." International Journal of Immunopharmacology 19(5): 255-262 (1997).
Exhibit C: Mortell et al. "Fetal bovine serum and other sera used in tissue culture increase epithelial permeability." In Vitro Cellular & Developmental Biology—Animal 29(3): 235-238 (1993).
Exhibit D: Vasanthan et al. "LPS from bovine serum albumin drives TNF-α release during ex-vivo placenta perfusion experiments, contaminates the perfusion system but can be effectively removed by oxidative cleaning." Placenta 35(12): 1095-1098 (2014).
Exhibit E: "Harrison's Principles of Internal Medicine" 17th Edition, ed. Fauci et al., McGraw Hill, 2008. Appendix, p. A3-A7, Table 2 and Table 3, p. A11.
"Harrison's Principles of Internal Medicine" 17th Edition, ed. Fauci et al., McGraw Hill, 2008.

* cited by examiner

*Primary Examiner* — Lynn Y Fan
(74) *Attorney, Agent, or Firm* — Nixon Peabody LLP; David S. Resnick; Ravinderjit S. Braich

(57) ABSTRACT

A lung perfusion solution comprises a base solution comprising a physiological mixture of electrolytes and buffers, 3.5-5.5% (w/v) a first macromolecule having a molecular weight of 40-100 KDa, and an amount of a second, high molecular weight, macromolecule sufficient to adjust the relative viscosity of the solution to 2.0-3.0.

19 Claims, 10 Drawing Sheets

(A)

(B)

(C)

LUNG PERFUSION SOLUTION, AND USE THEREOF FOR THE EX-VIVO PRESERVATION OF A MAMMALIAN LUNG

CROSS REFERENCE TO RELATED APPLICATIONS

This application is a continuation application of U.S. application Ser. No. 15/564,703 filed Oct. 5, 2017, which is a 35 U.S.C. § 371 National Phase Entry of International Patent Application No. PCT/EP2016/057846 filed on Apr. 8, 2016 which designated the U.S., which claims priority to and benefit of GB Application No. 1505987.6, filed Apr. 8, 2015, the contents of all of which are incorporated herein by reference in their entireties.

TECHNICAL FIELD

The invention relates to an organ, typically a lung, perfusion solution, and the use thereof for the ex-vivo perfusion of a mammalian organ, preferably a lung, prior to implantation of the organ into a recipient patient.

BACKGROUND TO THE INVENTION

Organ transplantation, including heart, liver, kidney and lung transplantation, is now a standard procedure used to treat irreversible organ failure. An important limiting factor in the use of this treatment option is of shortage of suitable donor organs. Until recently, perfusion of the donor organ at the time of explantation with cold flush solution followed by cold storage during transportation has been the accepted standard technique for preservation of donor lungs. This is a successful technique provided that ischaemia times are not prolonged.

The shortage of suitable donor organs, particularly in the field of lung transplantation has prompted the development of methods of ex-vivo lung perfusion in order to assess "marginal" donor lungs and potentially to improve the condition (i.e. restore the function) of such lungs so that they could become suitable for transplantation (Cypel et al., 2011, Warnecke et al., 2012). Such systems have been used after a period of cold storage and transplantation for assessment and re-conditioning of donor lungs and, more recently with the development of portable perfusion apparatus, for the transportation of organs from the donor to a recipient at a distant site (Cypel et al., 2011, Ingemansson et al., 2009, Wallinder et al., 2012, Wallinder et al., 2014, Warnecke et al., 2012).

The compositions of solutions that have been used for cold storage differ from those used for normothermic (37° C.) ex vivo perfusion; the main constituents of those commonly used over several decades are shown in Table 1. The composition of solutions used for ex vivo perfusion is usually different, in general containing a mixture of electrolytes and buffers that closely resemble those found in normal plasma and maintain osmotic pressure and pH similar to that of blood. In addition, a large molecular weight molecule or molecules such as albumin, globulins or other substitutes, is added to provide colloid osmotic pressure (oncotic pressure) to retain water within the intravascular compartment and thus prevent the formation of oedema. Such solutions have been used since the late $19^{th}$ century in physiological experiments investigating normal function using ex vivo perfusion techniques.

For example, in previous research work, the Applicant has perfused rat and mouse lungs ex vivo using solutions that share the properties of the solutions described above (Cadogan et al., 1999, Cahill et al., 2012a, Cahill et al., 2012b, Hyvelin et al., 2005, Ooi et al., 2000). In some protocols erythrocytes are added to provide more nearly normal physiological oxygen content in the perfusate (Cadogan et al., 1999, Ooi et al., 2000). Recently, in work in ex vivo mouse lungs, and for convenience, the Applicant has used commercially available solution comprising a cell culture medium (Dulbecco's modified extracellular medium) that has the features of extracellular fluids described above (DMEM) into which Ficoll PM70 is dissolved, which has a molecular weight of approximately 70 kDa, similar to that of albumin (≈69 kDa), at a concentration similar to that of albumin in normal plasma (4 grams/100 ml), which provides physiological colloid osmotic pressure. When mouse lungs are perfused with this solution physiological measurements can be obtained and the lung will typically show normal vascular function for a limited period of between one and two hours.

The use of ex vivo perfusion techniques to preserve and re-condition organs for transplantation has prompted the development of a number of proprietary solutions for perfusion such as the Steen solutions (Patents: Steen WO2013051977 A1 2013, Steen WO 02/35929A1 2002, Segall et al. US08/896,824 2002). Erythrocytes are added to these in some protocols (Steen). These differ from the classical physiological solutions in a number of features including the addition of antioxidants, the addition of agents that protect the vascular endothelium, hormones and neurotransmitters at physiological concentrations and the use of higher than normal concentrations of albumin and/or globulin. The higher than normal concentrations of albumin and globulins are used to produce colloid osmotic pressures above the normal range to correct oedema that may have formed prior to, or following donor organ explanation.

It is well established that shear stress alters the function of the normal vascular endothelium in important ways. For example, the well described physiological property of flow mediated vasodilatation, which contributes to the regulation of normal blood flow, is endothelium dependent and results from shear stress mediated release of vasoactive compounds including prostacyclin and nitric oxide (Cabrales et al., 2005a, Cabrales et al., 2005b, Cooke et al., 1991, Cooke et al., 1990, Frangos et al., 1985, Giannattasio et al., 2002, Melkumyants et al., 1989, Pohl et al., 1991). Increased shear stress has been reported to increase or decrease endothelial permeability, potentially suggesting that there is an optimal normal shear stress, specific to each organ for the maintenance of normal vascular permeability (Bevan et al., 2011, Kim et al., 2005, Pan, 2009, Walsh et al., 2011). Furthermore the effects of acute and chronic changes in shear stress may be different (Warboys et al., 2010).

Endothelial shear stress depends on multiple factors including the velocity of perfusate across the endothelial glycocalyx and the viscosity of the perfusate (Fahraeus and Lindqvist, 1931, Sirs, 1991). To the knowledge of the Applicant, the effect of changes in viscosity of the perfusate on the preservation of function in isolated ventilated perfused lungs has not previously been explicitly examined.

STATEMENTS OF INVENTION

The Applicant has discovered that better preservation of lung function is achieved if, in addition to the features described above, the viscosity of the solution is adjusted to be similar to that of the blood that normally perfuses the small vessels of the lung. Blood is a complex fluid, which behaves in a non-Newtonian fashion such that its viscosity varies with the radius of the tube through which it flows (Fahraeus and Lindqvist, 1931). In the small vessels of the lung, and other organs such as the kidney, liver and heart, it has a viscosity relative to water (hereafter "relative viscosity") of approximately 2.5, whereas in larger conduction vessels such as the aorta and the pulmonary artery it has a relative viscosity of 4.0. The purpose of using a solution with a relative viscosity of 2 to 3 is to optimise the function of the small vessels and capillaries within the lung, and other organs, as they are the site at which increased permeability leads to oedema formation.

In a first aspect, the invention provides a lung perfusion solution comprising:

a base solution comprising a physiological mixture of electrolytes and buffers; and 3.5 to 5.5% (w/v) a first macromolecule having a molecular weight of 40-100 kDa, characterised in that the solution comprises an amount of a second, high molecular weight, macromolecule sufficient to adjust the relative viscosity of the solution to 2.0-3.0.

The Applicant has surprisingly discovered that incorporation of a very high molecular weight macromolecule allowed the viscosity of the solution to be increased with only a minimal associated increase in solution osmolality. The data presented below shows the effect on the development of pulmonary oedema and the pressure flow characteristic of the pulmonary circulation. In particular, the data in Table 3 shows that the incidence of pulmonary oedema, and the mean increase in peak airway pressure, was lower at the end of the perfusion period when a perfusion solution according to the invention was employed compared with two solutions according to the prior art.

Preferably, the relative viscosity of the solution is about 2.0-3.0, preferably about 2.1-2.9, or about 2.2-2.8, or about 2.2-2.7, or about 2.3-2.6, more preferably 2.4-2.6, and ideally is about 2.5.

Preferably, the second, high molecular weight, macromolecule has a molecular weight of 350-600 kDa.

Preferably, the second, high molecular weight, macromolecule has a molecular weight of 380-420 kDa.

Preferably, the second, high molecular weight, macromolecule has a molecular weight of 390-410 kDa.

Ideally, the second, high molecular weight, macromolecule has a molecular weight of about 400 kDa.

Typically, the second, high molecular weight, macromolecule is a polymer or a branched polymer.

Preferably, the second, high molecular weight, macromolecule is a branched polysaccharide.

Typically, the second, high molecular weight, macromolecule is a hydrophilic polymer. Preferably, the second, high molecular weight, macromolecule is non-ionic.

Preferably, the second, high molecular weight, macromolecule is a branched hydrophilic polysaccharide.

Ideally, the second, high molecular weight, macromolecule is a FICOLL PM400.

Preferably, the second, high molecular weight, macromolecule is provided in an amount of about 2-5%, more preferably 3-4%, and ideally 3.0-3.5% (w/v). However, the exact amount employed is variable depending on the other components in the solution. For example, when the base is a cell culture medium and the first macromolecule has a molecular weight of about 70 kDa and provided at about 4%, then it has been determined that approximately 3.25% of a second macromolecule having an approximate molecular weight of 400 kDa is sufficient to adjust the relative viscosity to 2.5.

Typically, the first macromolecule is a molecule having a molecular weight of 40-80 kDa.

Typically, the first macromolecule is a molecule having a molecular weight of 60-80 kDa.

Typically, the first macromolecule is a polymer or a branched polymer.

Preferably, the first macromolecule is a branched polysaccharide.

Typically, the first macromolecule is a hydrophilic polymer.

Preferably, the first macromolecule is non-ionic.

Preferably, the first macromolecule is a branched hydrophilic polysaccharide.

Ideally, the first macromolecule is a FICOLL PM70.

Typically, the first macromolecule is provided in an amount of 3-5%, preferably 3.5-4.5%, and ideally about 4.0% (w/v). This amount has been found to be sufficient to exert a colloid osmotic pressure within the vascular space that is sufficient to prevent rapid development of pulmonary odema when the solution is perfused through the lungs.

In one embodiment, the invention provides a lung perfusion solution according to the invention and comprising:

3-5% of the first macromolecule, in which the first macromolecule has a molecular weight of 40-100 kDa;

2-5% of the second macromolecule, in which the second macromolecule has a molecular weight of 350-600 kDa.

In one embodiment, the invention provides a lung perfusion solution according to the invention and comprising:

3-5% of the first macromolecule, in which the first macromolecule is a branched polysaccharide having a molecular weight of 40-100 kDa;

2-5% of the second macromolecule, in which the second macromolecule is a branched polysaccharide a molecular weight of 350-600 kDa.

In one embodiment, the invention provides a lung perfusion solution according to the invention and comprising:

3-5% of the first macromolecule, in which the first macromolecule is a branched polysaccharide having a molecular weight of 60-80 kDa;

2-5% of the second macromolecule, in which the second macromolecule is a branched polysaccharide a molecular weight of 380-420 kDa.

In one embodiment, the invention provides a lung perfusion solution according to the invention and comprising:

3.5-4.5% of the first macromolecule, in which the first macromolecule is a branched polysaccharide having a molecular weight of 60-80 kDa;

3.0-3.5% of the second macromolecule, in which the second macromolecule is a branched polysaccharide a molecular weight of 380-420 kDa.

In one embodiment, the invention provides a lung perfusion solution according to the invention and comprising:

3-5% of FICOLL PM70, or an equivalent thereof; and 2-5% of FICOLOL PM400, or an equivalent thereof.

Typically, the base solution comprising a physiological mixture of electrolytes and buffers is a physiological salt solution having a composition similar to mammalian (i.e. human) extracellular fluid. One suitable example is a cell culture medium for mammalian cells, although other physiological salt solutions are envisaged. An example is DMEM media from Sigma Aldrich. Other cell culture medium suitable for culturing mammalian cells or other buffered physiological salt solutions may be employed as the base solution, the details of which will be known to the person skilled in the art.

The invention also provides a method of preserving a lung ex vivo comprising a step of perfusing a lung perfusion solution according to the invention through the vasculature of the lung.

In a first aspect, the invention provides an organ perfusion solution comprising:

a base solution comprising a physiological mixture of electrolytes and buffers; and 3.5 to 5.5% (w/v) a first macromolecule having a molecular weight of 40-100 kDa, characterised in that the solution comprises an amount of a second, high molecular weight, macromolecule sufficient to adjust the relative viscosity of the solution to 2.0-3.0.

The Applicant has discovered that incorporation of a very high molecular weight macromolecule allowed the viscosity of the solution to be increased with only a minimal associated increase in solution osmolality.

Preferably, the relative viscosity of the solution is about 2.0-3.0, preferably about 2.1-2.9, or about 2.2-2.8, or about 2.2-2.7, or about 2.3-2.6, more preferably 2.4-2.6, and ideally is about 2.5.

Preferably, the second, high molecular weight, macromolecule has a molecular weight of 350-600 kDa.

Preferably, the second, high molecular weight, macromolecule has a molecular weight of 380-420 kDa.

Preferably, the second, high molecular weight, macromolecule has a molecular weight of 390-410 kDa.

Ideally, the second, high molecular weight, macromolecule has a molecular weight of about 400 kDa.

Typically, the second, high molecular weight, macromolecule is a polymer or a branched polymer.

Preferably, the second, high molecular weight, macromolecule is a branched polysaccharide.

Typically, the second, high molecular weight, macromolecule is a hydrophilic polymer.

Preferably, the second, high molecular weight, macromolecule is non-ionic.

Preferably, the second, high molecular weight, macromolecule is a branched hydrophilic polysaccharide.

Ideally, the second, high molecular weight, macromolecule is a FICOLL PM400.

Preferably, the second, high molecular weight, macromolecule is provided in an amount of about 2-5%, more preferably 3-4%, and ideally 3.0-3.5% (w/v). However, the exact amount employed is variable depending on the other components in the solution. For example, when the base is a cell culture medium and the first macromolecule has a molecular weight of about 70 kDa and provided at about 4%, then it has been determined that approximately 3.25% of a second macromolecule having an approximate molecular weight of 400 kDa is sufficient to adjust the relative viscosity to 2.5.

Typically, the first macromolecule is a molecule having a molecular weight of 40-80 kDa.

Typically, the first macromolecule is a molecule having a molecular weight of 60-80 kDa.

Typically, the first macromolecule is a polymer or a branched polymer.

Preferably, the first macromolecule is a branched polysaccharide.

Typically, the first macromolecule is a hydrophilic polymer.

Preferably, the first macromolecule is non-ionic.

Preferably, the first macromolecule is a branched hydrophilic polysaccharide.

Ideally, the first macromolecule is a FICOLL PM70.

Typically, the first macromolecule is provided in an amount of 3-5%, preferably 3.5-4.5%, and ideally about 4.0% (w/v). This amount has been found to be sufficient to exert a colloid osmotic pressure within the vascular space that is sufficient to prevent rapid development of pulmonary oedema when the solution is perfused through the lungs. The amount should also be sufficient to prevent rapid development of oedema when the solution is perfused through the kidney, heart or liver.

In one embodiment, the organ is selected from lung, heart, kidney and liver.

In one embodiment, the invention provides an organ perfusion solution according to the invention and comprising:

3-5% of the first macromolecule, in which the first macromolecule has a molecular weight of 40-100 kDa;

2-5% of the second macromolecule, in which the second macromolecule has a molecular weight of 350-600 kDa.

In one embodiment, the invention provides an organ perfusion solution according to the invention and comprising:

3-5% of the first macromolecule, in which the first macromolecule is a branched polysaccharide having a molecular weight of 40-100 kDa;

2-5% of the second macromolecule, in which the second macromolecule is a branched polysaccharide a molecular weight of 350-600 kDa.

In one embodiment, the invention provides an organ perfusion solution according to the invention and comprising:

3-5% of the first macromolecule, in which the first macromolecule is a branched polysaccharide having a molecular weight of 60-80 kDa;

2-5% of the second macromolecule, in which the second macromolecule is a branched polysaccharide a molecular weight of 380-420 kDa.

In one embodiment, the invention provides an organ perfusion solution according to the invention and comprising:

3.5-4.5% of the first macromolecule, in which the first macromolecule is a branched polysaccharide having a molecular weight of 60-80 kDa;

3.0-3.5% of the second macromolecule, in which the second macromolecule is a branched polysaccharide a molecular weight of 380-420 kDa.

In one embodiment, the invention provides an organ perfusion solution according to the invention and comprising:

3-5% of FICOLL PM70, or an equivalent thereof; and 2-5% of FICOLOL PM400, or an equivalent thereof.

Typically, the base solution comprising a physiological mixture of electrolytes and buffers is a physiological salt solution having a composition similar to mammalian (i.e. human) extracellular fluid. One suitable example is a cell culture medium for mammalian cells, although other physiological salt solutions are envisaged. An example is DMEM media from Sigma Aldrich. Other cell culture medium suitable for culturing mammalian cells or other buffered physiological salt solutions may be employed as the base solution, the details of which will be known to the person skilled in the art.

The invention also provides a method of preserving an organ ex vivo comprising a step of perfusing an organ perfusion solution according to the invention through the vasculature of the organ.

In a further aspect of the invention, there is provided a solution, typically an organ perfusion solution, comprising:

a base solution comprising a physiological mixture of electrolytes and buffers; and 3.5 to 5.5% (w/v) a first macromolecule having a molecular weight of 40-100 kDa, characterised in that the solution comprises an amount of a second, high molecular weight, macromolecule sufficient to adjust the relative viscosity of the solution to 2.0-3.0.

Preferably, the relative viscosity of the solution is about 2.0-3.0, preferably about 2.1-2.9, or about 2.2-2.8, or about 2.2-2.7, or about 2.3-2.6, more preferably 2.4-2.6, and ideally is about 2.5.

Preferably, the second, high molecular weight, macromolecule has a molecular weight of 350-600 kDa.

Preferably, the second, high molecular weight, macromolecule has a molecular weight of 380-420 kDa.

Preferably, the second, high molecular weight, macromolecule has a molecular weight of 390-410 kDa.

Ideally, the second, high molecular weight, macromolecule has a molecular weight of about 400 kDa.

Typically, the second, high molecular weight, macromolecule is a polymer or a branched polymer.

Preferably, the second, high molecular weight, macromolecule is a branched polysaccharide.

Typically, the second, high molecular weight, macromolecule is a hydrophilic polymer.

Preferably, the second, high molecular weight, macromolecule is non-ionic.

Preferably, the second, high molecular weight, macromolecule is a branched hydrophilic polysaccharide.

Ideally, the second, high molecular weight, macromolecule is a FICOLL PM400.

Preferably, the second, high molecular weight, macromolecule is provided in an amount of about 2-5%, more preferably 3-4%, and ideally 3.0-3.5% (w/v). However, the exact amount employed is variable depending on the other components in the solution. For example, when the base is a cell culture medium and the first macromolecule has a molecular weight of about 70 kDa and provided at about 4%, then it has been determined that approximately 3.25% of a second macromolecule having an approximate molecular weight of 400 kDa is sufficient to adjust the relative viscosity to 2.5.

Typically, the first macromolecule is a molecule having a molecular weight of 40-80 kDa.

Typically, the first macromolecule is a molecule having a molecular weight of 60-80 kDa.

Typically, the first macromolecule is a polymer or a branched polymer.

Preferably, the first macromolecule is a branched polysaccharide.

Typically, the first macromolecule is a hydrophilic polymer.

Preferably, the first macromolecule is non-ionic.

Preferably, the first macromolecule is a branched hydrophilic polysaccharide.

Ideally, the first macromolecule is a FICOLL PM70.

Typically, the first macromolecule is provided in an amount of 3-5%, preferably 3.5-4.5%, and ideally about 4.0% (w/v).

In one embodiment, the invention provides a solution, typically an organ perfusion solution, according to the invention and comprising:

3-5% of the first macromolecule, in which the first macromolecule has a molecular weight of 40-100 kDa;
2-5% of the second macromolecule, in which the second macromolecule has a molecular weight of 350-600 kDa.

In one embodiment, the invention provides a solution, typically an organ perfusion solution, according to the invention and comprising:

3-5% of the first macromolecule, in which the first macromolecule is a branched polysaccharide having a molecular weight of 40-100 kDa;
2-5% of the second macromolecule, in which the second macromolecule is a branched polysaccharide a molecular weight of 350-600 kDa.

In one embodiment, the invention provides a solution, typically an organ perfusion solution, according to the invention and comprising:

3-5% of the first macromolecule, in which the first macromolecule is a branched polysaccharide having a molecular weight of 60-80 kDa;
2-5% of the second macromolecule, in which the second macromolecule is a branched polysaccharide a molecular weight of 380-420 kDa.

In one embodiment, the invention provides a solution, typically an organ perfusion solution, according to the invention and comprising:

3.5-4.5% of the first macromolecule, in which the first macromolecule is a branched polysaccharide having a molecular weight of 60-80 kDa;
3.0-3.5% of the second macromolecule, in which the second macromolecule is a branched polysaccharide a molecular weight of 380-420 kDa.

In one embodiment, the invention provides a solution, typically an organ perfusion solution, according to the invention and comprising:

3-5% of FICOLL PM70, or an equivalent thereof; and
2-5% of FICOLOL PM400, or an equivalent thereof.

Typically, the base solution comprising a physiological mixture of electrolytes and buffers is a physiological salt solution having a composition similar to mammalian (i.e. human) extracellular fluid. One suitable example is a cell culture medium for mammalian cells, although other physiological salt solutions are envisaged. An example is DMEM media from Sigma Aldrich. Other cell culture medium suitable for culturing mammalian cells or other buffered physiological salt solutions may be employed as the base solution, the details of which will be known to the person skilled in the art.

DETAILED DESCRIPTION OF THE INVENTION

Definitions

Figure 1:
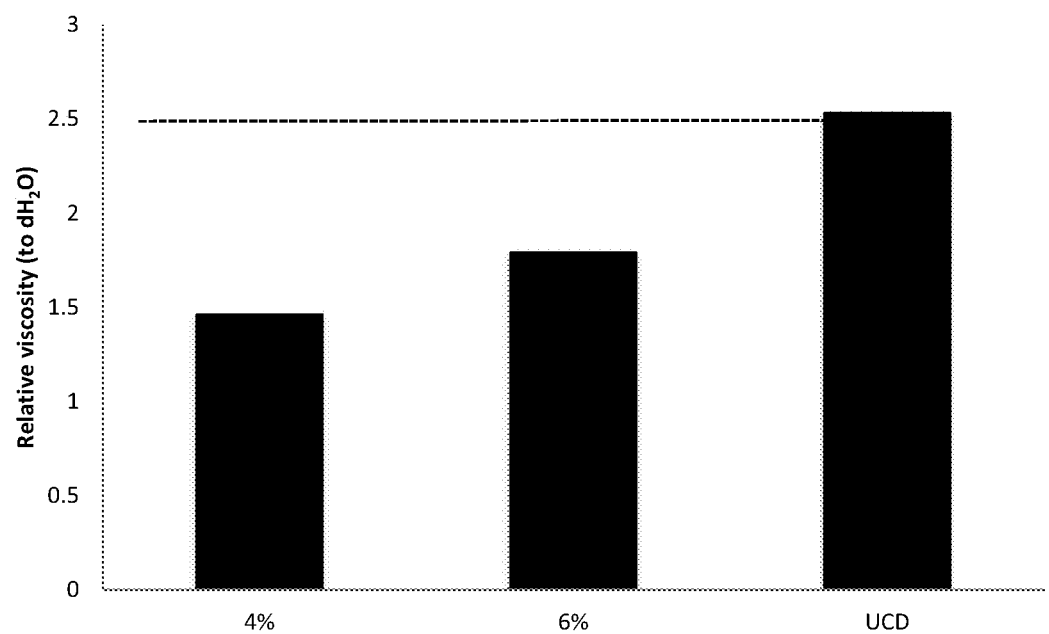
FIG. 1. The viscosity of 4% PM70, 6% PM70 and UCD solution relative to water. The approximate viscosity of blood in small diameter blood vessels of the lung is indicated by the dashed line.

"Organ perfusion solution" means a solution suitable for perfusing through the vasculature of a mammalian organ ex vivo and capable of sustaining the cells of the organ and preserving organ function for a period of time ex vivo, and inhibiting the onset of organ damage, for example, oedema of the heart, kidney, liver or pulmonary odema, compared with a respective organ that is not perfused with the organ perfusion solution. There are a number of important features to be considered in the design of preservation or perfusion solutions (Table 1); the four most commonly described are listed below:

Ionic composition: Preservation solutions can be broadly classified as intracellular or extracellular based on the potassium and sodium concentrations. Intracellular solutions mimic the high potassium/low sodium conditions present within the cellular milieu to minimize potential concentration gradients across the plasma membrane that could favour potassium efflux. Extracellular solutions are typically low in potassium.

Osmotic properties: Hypothermia causes reduced function of the $Na^+/K^+$ pumps in the cellular membrane resulting in cellular oedema through sodium and water influx into the cell. Preservation solutions either mimic the normal osmotic pressure of the extracellular fluids of the body or have a higher than normal osmotic pressure (achieved by addition of the molecules to which the cell membrane is poorly permeable). The addition of such impermeant molecules creates an osmotic force that preferentially promotes water retention in the extracellular cellular compartment to counteract this effect of poorly functioning $Na^+/K^+$ pumps.

pH Buffering: Many preservation solutions contain a buffer to combat the effects of metabolic acidosis that result from the shift of aerobic to anaerobic metabolism during periods of ischemia.

Antioxidants: Reactive oxygen species are an inevitable consequence of tissue ischemia during an ex vivo period and can lead to significant cellular damage.

Colloid osmotic or oncotic pressure: In the plasma of normal blood, albumin exerts a colloid osmotic pressure that inhibits leakage of fluid from the vascular space into the interstitial spaces of the organ and the subsequent formation of oedema. This action of albumin results from its high molecular weight (about 69 kilodaltons), which means that it cannot easily cross the vascular endothelium of the small blood vessels into the interstitial spaces of the organ.

"Lung perfusion solution" means a solution suitable for perfusing through the vasculature of a mammalian lung ex-vivo and capable of sustaining the cells of the lung for a period of time ex-vivo and inhibiting the onset of pulmonary odema compared with a lung that is not perfused with the lung perfusion solution. There are a number of important features to be considered in the design of preservation or perfusion solutions (Table 1); the four most commonly described are listed below:

Ionic composition: Preservation solutions can be broadly classified as intracellular or extracellular based on the potassium and sodium concentrations. Intracellular solutions mimic the high potassium/low sodium conditions present within the cellular milieu to minimize potential concentration gradients across the plasma membrane that could favour potassium efflux. Extracellular solutions are typically low in potassium.

Osmotic properties: Hypothermia causes reduced function of the $Na^+/K^+$ pumps in the cellular membrane resulting in cellular oedema through sodium and water influx into the cell. Preservation solutions either mimic the normal osmotic pressure of the extracellular fluids of the body or have a higher than normal osmotic pressure (achieved by addition of the molecules to which the cell membrane is poorly permeable). The addition of such impermeant molecules creates an osmotic force that preferentially promotes water retention in the extracellular cellular compartment to counteract this effect of poorly functioning $Na^+/K^+$ pumps.

pH Buffering: Many preservation solutions contain a buffer to combat the effects of metabolic acidosis that result from the shift of aerobic to anaerobic metabolism during periods of ischemia.

Antioxidants: Reactive oxygen species are an inevitable consequence of tissue ischemia during an ex vivo period and can lead to significant cellular damage.

Colloid osmotic or oncotic pressure: In the plasma of normal blood, albumin exerts a colloid osmotic pressure that inhibits leakage of fluid from the vascular space into the interstitial spaces of the organ and the subsequent formation of oedema. This action of albumin results from its high molecular weight (about 69 kilodaltons), which means that it cannot easily cross the vascular endothelium of the small blood vessels into the interstitial spaces of the organ.

It will be appreciated that although the invention relates primarily to a lung perfusion solution, the perfusion solution of the invention may be employed for perfusion of other mammalian organs, such as for example heart, liver and kidney.

"Base solution comprising a physiological mixture of electrolytes and buffers" means a solution that mimics the composition of mammalian human blood plasma in its ionic concentration, pH and other constituents.

"Colloid osmotic pressure (or oncotic pressure)" is the osmotic pressure in blood plasma, or similar solutions, that is due to the protein present (or other large molecules) to which the vascular endothelium has a very low permeability. It is a small fraction of the total osmotic pressure of plasma or similar solutions but plays a key role in regulating the distribution of water between the intravascular and extravascular spaces.

"First macromolecule" means a polymer comprising a polysaccharide or protein that typically has a molecular weight of 40-100 kDa, and more preferably has a molecular weight of 60-80 kDa. One preferred example of the first macromolecule is FICOLL PM70, although other polymers could be employed for example dextran, hetastarch or large polypeptides or large polysaccharides.

"Second high molecular weight macromolecule" means a polymer comprising a polysaccharide or protein that typically has a molecular weight of 350-600 kDa, preferably 350-400 kDa, and more preferably has a molecular weight of about 400 kDa. One preferred example of the first macromolecule is FICOLL PM400, although other polymers could be employed for example dextran, hetastarch or large polypeptides.

"Polysaccharide" means a polysaccharide-based polymer which may be in the form of a homopolymer or a copolymer. One example is FICOLL PM400 which is a copolymer of sucrose and epichlorohydrin. The polysaccharide may be any polysaccharide, for example dextran, starch or alginate.

"Hydrophilic polymer" means a molecule that is soluble in distilled water in an amount of at least 0.06% (w/v).

"Perfusing through the vasculature of the lung" means pumping a solution through the vasculature of the lung in a circuit so that the cells lining the vasculature are continuously perfused with the solution.

"Relative viscosity" means the ratio of the viscosity of a test solution to the viscosity of ultrapure deionised water. Measurement of viscosity is carried out using an Ostwald Viscometer B as described below.

Experimental

Methods

Male wild-type C56B16 (10-12 weeks old) were maintained in a normoxic conditions ($FIO_2=0.21$, $FICO_2<0.01$). All mice were maintained in a specific pathogen-free facility with free access to water and food.

Isolated Perfused Lung Preparation

Mice were sedated by inhalation of isoflurane inhalation anaesthetic and then anaesthetised by intraperitoneal injection of sodium pentobarbitone (60 mg·kg-1) (Rhone Merieux Ltd, Harlow, UK) and anti-coagulating using heparin (1000 I.U/kg; Leo Laboratories Ltd, Princes Risborough, UK). After confirming depth of anaesthesia by absence of response to tail compression, the femoral artery was incised and the mice killed by exsanguination. Two glass micropipette tubes were filled with blood, sealed at one end, and centrifuged (Adams microhaematocrit centrifuge, Clay-Adams) and the haematocrit assessed. The trachea was exposed, a tracheal cannula inserted and secured in place with thread. The tracheal cannula was connected to a ventilator (Minivent type 845, Hugo Sachs Elektronic-Harvard Apparatus, Germany) and the animal ventilated (5% CO2, balance air, tidal volume 250 ul, respiratory frequency 90). A midline incision was made from the sternum to neck and the ribs retracted to expose the heart and lungs. The lower half of the animal was the resected. The pulmonary artery cannula was advanced through a small incision in the right ventricle and secured in place in the pulmonary artery. A cannula was advanced through the left ventricle via an incision in the apex of the heart.

The lungs were perfused at 1 ml/min, for at least 10 minutes to obtain a stable baseline pressure, using a roller pump (IDEX Health and Science Gmbh, Germany). They were then perfused at 2 ml/min, 3 ml/min, 4 ml/min and 5 ml/min for 5 minutes per flow rate to generate a pressure flow curve with one of three perfusates (see below). Following the pressure flow curve the flow rate was returned to 2 ml/min and the experiment continued for a total of 180 mins or evidence of the development of oedema, which ever occurred first.

Progressively increasing peak airway pressures are indicative of fluid accumulation in the isolated lung preparations. Experiments were stopped if the following was observed:

Progressive appearance of oedema fluid involving two or more lobes and peak airway pressures greater than 5.5 mmHg.

At the end of each experiment the lungs were removed, placed in cryovials and snap frozen in liquid nitrogen for later analysis of shear responsive protein phosphorylation by Western Blot technique.

Recording Pressure Measurements

Pulmonary artery pressure, peak end expiratory pressure and venous outflow pressure measurements were recorded at intervals of 10 minutes, during end expiration, for 10 consecutive breaths during the final minute prior to the next hyper-inflation. For pressure at each of these sites the mean of the ten measurements was taken as the pressure at that time.

Peak airway pressure measurements were recorded continuously throughout each experiment and then analysed at peak inspiration for 10 consecutive breaths sampled during the final minute prior to the next hyperinflation.

Estimation of Alpha and R0 From the P/Q Curve

Values for Alpha, representing the distensibility of the pulmonary resistance vessels, and R0, representing the hemodynamic resistance of the undistended pulmonary vascular bed (i.e. the resistance at zero flow), were obtained by applying the model of the pulmonary circulation developed by Linehan et al. (J. Appl Physiol 73 (3): 987-994, 1992) to the pressure-flow curve data generated in these isolated perfused lung experiments. The values of R0 obtained for the three different solutions were then used to compute the R0 that would have been obtained had all lungs been perfused with a solution whose viscosity equalled that of water, R0(H2O). This R0(H2O) value thus reflects changes in the vascular conductance excluding the effects of the different solution viscosities on the pressure flow curves.

Western Blotting

Endothelial nitric oxide synthase phosphorylated at serine 1177 (PO4-eNOS) was measured in snap frozen lung tissue by Western Blot technique. Snap frozen lungs were homogenised in 1XRIPA lysis buffer (1 ml per 100 mg tissue) containing phosphatase inhibitor (PhosSTOP, Sigma, Ireland) and protease inhibitor (cOmplete Mini, Sigma, Ireland) cocktail tablets using a 4 mm steal bead and a bead mill at 50 oscillations/s in 5 minute bursts (TissueLyser LT, Qiagen, Germany) until the lung was completely liquid. Equal protein (30 µg) of each sample was loaded and separated by electrophoresis on a 6% SDS-PAGE gel and electroblotted onto PVDF membranes. Non-specific binding was blocked by incubating blots in 5% non-fat dry milk in TBS-T at room temperature for 1 hour. Membranes were probed with a PO4-eNOS rabbit monoclonal antibody (s1177, 1:1000 dilution, Cell Signaling) overnight at 4° C. Membranes were washed and then incubated with secondary antibodies conjugated to horseradish peroxidase (1:5000, anti-rabbit, Dako). Specific protein bands were detected by chemiluminescence autoradiography (Pierce ECL Western Blotting Substrate, Thermo Scientific, USA). Blots were stripped and re-probed for total eNOS (1:200, BD Biosciences) and HRP-conjugated β-tubulin (1:1000, Cell Signaling. Relative amounts of PO4-eNOS individual protein bands were normalised to the corresponding β-tubulin band by analysis of digitized images using Image J software.

Viscosity Measurements

The viscosity of each perfusate was measured using an Ostwald viscometer. Ostwald's viscometer B (K=0.01, Kinematic range 2-10) was placed in water-bath and equilibrated to 37° C. The viscometer was filled to the marked line with the test perfusate and the perfusate allowed to equilibrate to 37° C. Water was used as a control. Fluid was drawn up to the upper etched mark on the upper reservoir by suction and the time taken to flow from the upper etched mark to the lower etched mark was recorded. The viscosity was calculated using the following formula:

μ=Kpt
μ=viscosity
K=capillary tube constant (0.01 for viscometer B)
p=liquid density (kg/m$^3$)
t=time taken for the fluid to flow between etched lines on the viscometer upper reservoir The resulting viscosity value of each of the three solutions used for perfusion of the lungs was expressed relative to the viscosity of water and shown in FIG. 1 below.

Osmolality Measurements

Perfusate osmolality was measured using a vapour pressure osmometer (Vapro, Model 5520, Wescor Inc, USA). 10 μl of a given sample was aspirated into a micropipettor. The sample was then inoculated into a solute-free paper disc in the sample holder. The sample holder secured in the sample chamber. Locking the sample chamber initiated an automatic measurement sequence. Osmolality values (fig below) for each solution were the average of three sequential results with a spread of less than 6 mmol/kg. Prior to measuring the osmolality of the test solution the osmometer was calibrated with three calibration solutions (Opti—mole Osmolality Ampule Standards, Wescor Inc, USA) with osmolalities of 100 mmol/kg, 290 mmol/kg and 1000 mmol/kg. If the osmometer read within ±3 mmol/kg of standard on three sequential measurements it was deemed to be within acceptable calibration limits.

Preparation of Solutions

Ficoll Solutions

Three solutions were prepared for use in separate isolated lung preparations i.e. only one solution was used to perfuse any given lung preparation. The composition and the measured properties of these three solutions are outlined in Table 2 and in FIGS. 1 and 2.

Figure 2:
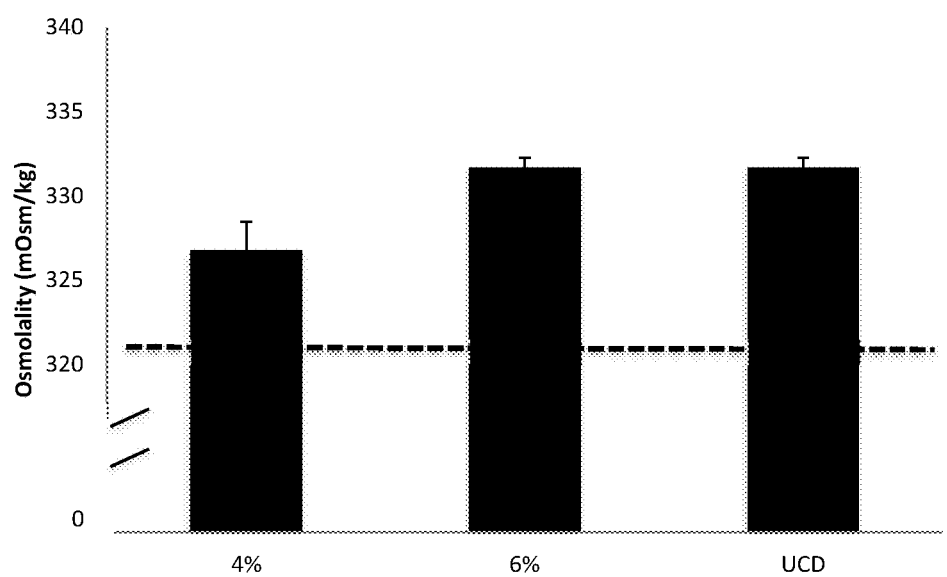
FIG. 2. Mean (±SD) osmolality of 4% PM70, 6% PM70 and UCD solution. The osmolality of DMEM is indicated by the dashed line.

The first solution is one that has previously been used extensively and consisted of DMEM and Ficoll PM70 4% (g/100 ml). This solution is referred to herein as 4% PM70 solution. The viscosity and osmotic pressure of this solution were then measured. A new solution containing DMEM, Ficoll PM70 4% and Ficoll PM400 3.25% i.e. sufficient Ficoll PM400 to produce a solution of relative viscosity 2.5, was prepared. This solution is referred to herein as 4% PM70+3.25% PM400 or "the UCD Solution". Finally, a solution containing DMEM plus Ficoll PM70 6% was also prepared. This solution had an osmotic pressure identical to that of the 4% PM70+3.25% PM400 (UCD solution) with only a small associated increase in relative viscosity (FIGS. 1 and 2). This was used to control for the effects of the small increase in osmotic pressure (approximately 1.5%) observed in our 4% PM70+3.25% PM400 solution (FIG. 2).

Alginate Solution

A further solution was prepared in which we used a sodium salt of alginic acid, an anionic polysaccharide (molecular weight 80-120 kDa), instead of Ficoll PM400, to obtain a relative viscosity of ≈2.5. Alginate can absorb absorb 200-300 its own weight in water leading to an elevated viscosity solution at comparatively low concentrations, thus having minimal effects on the oncotic pressure of the solution (Cabrales et al., 2005a, Cabrales et al., 2005b).

Alginate (A2033, Sigma Aldrich) at a concentration of 0.1% (wt.vol−1) was added to a solution of Ficoll PM70 4% (wt.vol$^{-1}$) in phosphate buffered saline. The solution was heated 60° C. and vigorously stirred while the alginate was added for at least 10 minutes before being passed through a filter syringe (0.2 μm Millex Filter, Millipore) to remove any undissolved particles. Preliminary experiments had shown that this solution had a relative viscosity of 2.5, the same as that of the UCD solution.

Wet Weight: Dry Weight Ratio and Evans Blue Extravasation

For assessment of Evans Blue extravasation and fluid accumulation a separate group of mice was prepared as described above (Isolated perfused lung preparation). Isolated lungs were perfused with either the 4% solution or UCD solution. Into the 4% and UCD solutions 0.6 mmol/L Evans Blue (Sigma, Ireland) and 0.5% BSA (w/v) (Sigma, Ireland) were added to allow assessment of albumin extravasation during the period of perfusion. Prior to perfusion both solutions were warmed to 37° C. and passed through a 0.22 μm filter (Millex Filters, Merck Millipore, Ireland). In the lungs perfused with 4% PM70 solution, a P/Q curve was generated and the lungs perfused at 2 ml min−1 until oedema developed or until 120 minutes had elapsed. For each lung perfused with 4% PM70, a matched lung was perfused with UCD solution for a time period identical to that for which the previous lung perfused with 4% PM70 had been perfused. At the end of both experiments the Evans Blue dye was flushed from the vasculature by perfusion of saline through the pulmonary artery for 5 minutes at 2 ml min−1.

At the end of the experimental period both right and left lungs were removed from the perfusion apparatus, gently blotted on tissue paper and then weighed to obtain the "wet" weight. They were then placed in an oven at 70° C. for 24 hours. The lung was weighed again to obtain the "dry" weight. The experiment "wet" weight was divided by the "dry" weight to give the wet weight:dry weight ratio. The wet weight:dry weight ratio in the right and left lung of each mouse was averaged and expressed as a single wet weight: dry weight ratio for each mouse.

After the "dry" lung weight had been obtained 1.5 ml of formamide (Sigma, Ireland) was added to each dried lung and the vial returned to the 70° C. oven for 1 hour. To extract the Evans Blue dye the lung was homogenised using a bead mill at 50 oscillations/s in 5 minute bursts (TissueLyser LT, Qiagen, Germany) until the lung was uniformly homogenised. The lung was then centrifuged at 14,000 rpm for 15 minutes to pellet any remaining tissue and the supernatant transferred to a fresh Eppendorf®. On the same day standard curve solutions were prepared by serial dilutions from a 100 μg/ml Evans Blue stock solution in formamide. The diluted standards and supernatant from each lung were loaded in triplicate onto a 96 well plate and the absorbance at 620 nm recorded. The absorbance values for each lung sample were averaged and the Evans Blue concentration calculated from the standard curve. The Evans Blue dye (EBD) concentration in each lung was divided by the dry weight of the lung to obtain EBD concentration per μg of dried lung tissue. The EBD concentration per μg of dried lung tissue in the right and left lung of each mouse were averaged and expressed as a single value for each mouse.

Statistics

All normally distributed data are presented as means (SEM or SD as indicated). Statistical significance of the difference between means was determined using unpaired t-tests. When multiple comparisons of means were undertaken the Holms-Sidak step-down correction was used.

Where data appeared non-normally distributed they are presented as Medians (±interquartile ranges) and the statistical significance of the difference between medians was tested using the Mann-Whitney U test. When multiple comparisons of means were undertaken the Holms-Sidak step-down correction was used.

Differences in frequency between groups were tested for statistical significance using the Chi square test.

Results

Figure 3:
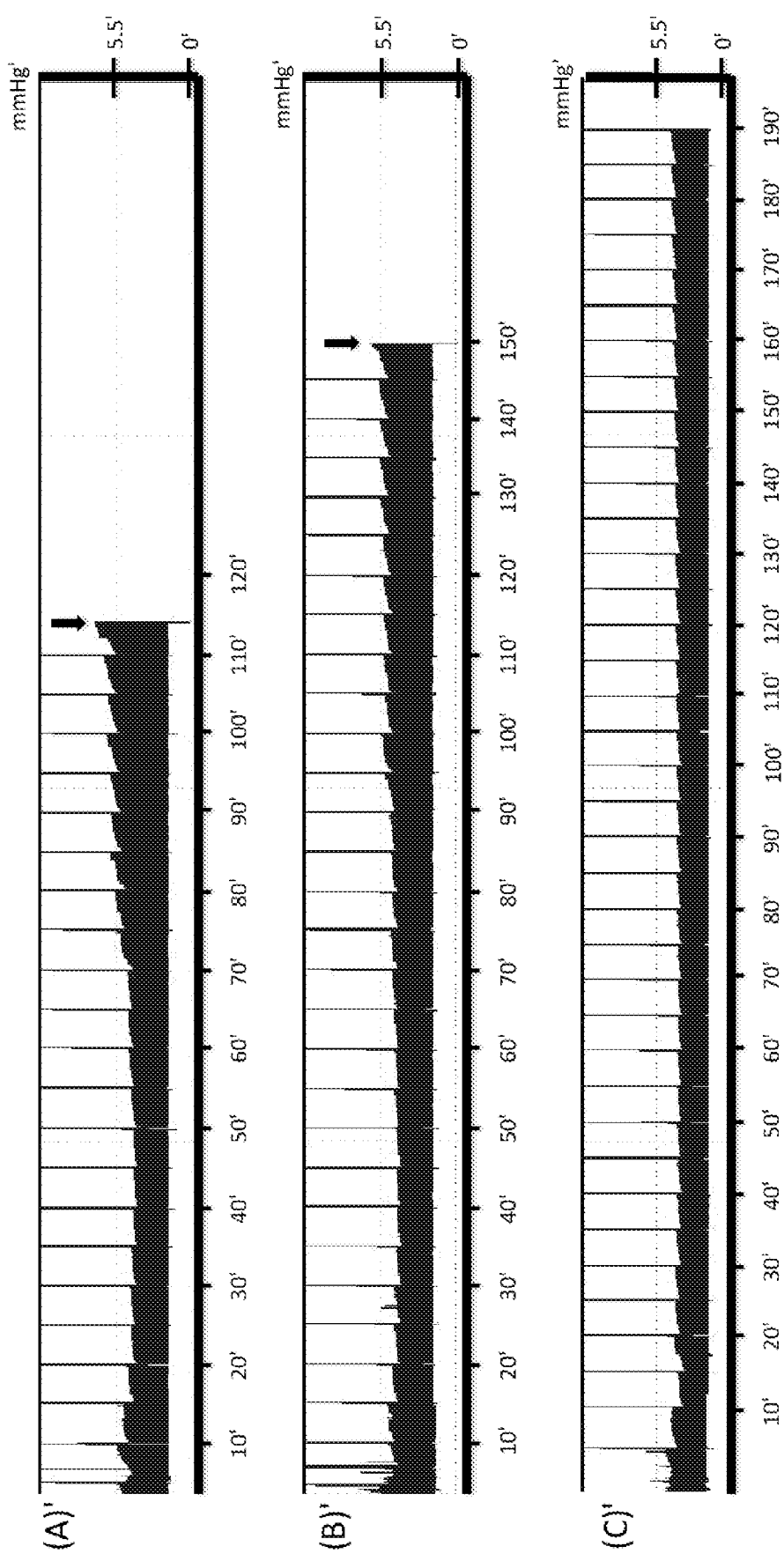
FIG. 3. Airway pressures over the course of ex vivo lung perfusion in a sample lung perfused with (A) 4% PM70, (B) 6% PM70 or (C) UCD solution. Progressively increasing peak airway pressures are indicative of pulmonary oedema development. ↓ Indicates where an experiment was stopped due to diffuse oedema development.

FIG. 3 shows reproductions of original experimental records of the peak airway pressures throughout the period of perfusion of the isolated lung preparations, an index of fluid leak into the lung interstitium. In lung perfused with 4% Ficoll PM70 (FIG. 3A) an initial period (approximately 80 min) of relatively stable peak airway pressures is observed, followed by a progressive rise. It can be seen that the rate of rise of pressure increased as perfusion continued. Once peak airway pressure exceeds 5.5 cmH$_2$O overt oedema can be observed in multiple sites throughout the lung. This was followed shortly after by the appearance of gross oedema fluid in the endotracheal tube if perfusion continued. A similar pattern of airway pressure change was observed in the lung perfused with the 6% Ficoll PM70 solution (FIG. 3B). In the lung perfused with 4% Ficoll PM70+3.25% Ficoll PM400 solution (FIG. 3C) peak airway pressure remained stable for 3 hours at which point the experiment was stopped. In initial experiments peak airway pressure remained stable for in excess of 4 hours.

Figure 4:
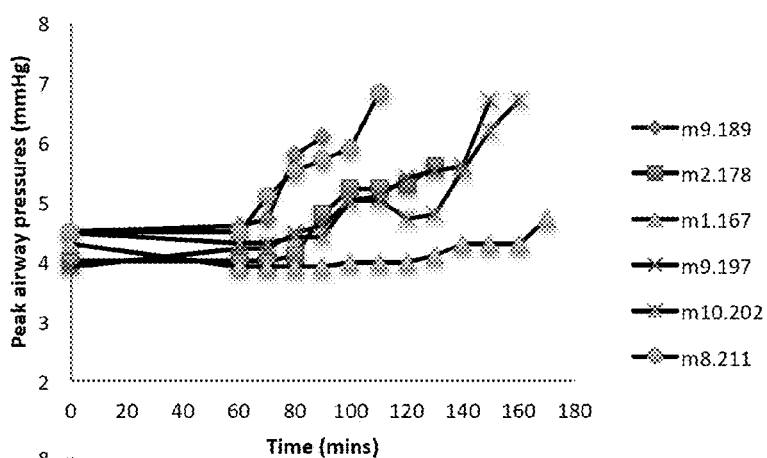
FIG. 4. Peak airway pressure over the course of lung perfusion in each animal perfused with (A) 4% PM70, (B) 6% PM70 and (C) UCD solution. N=6-8 per group.
Figure 4:
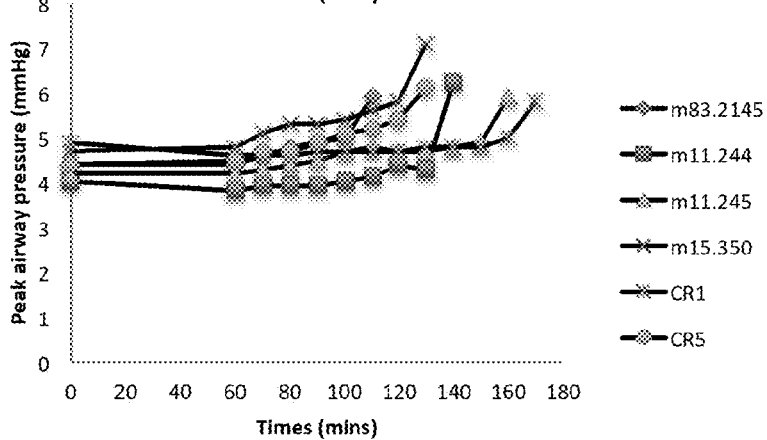
Figure 4:
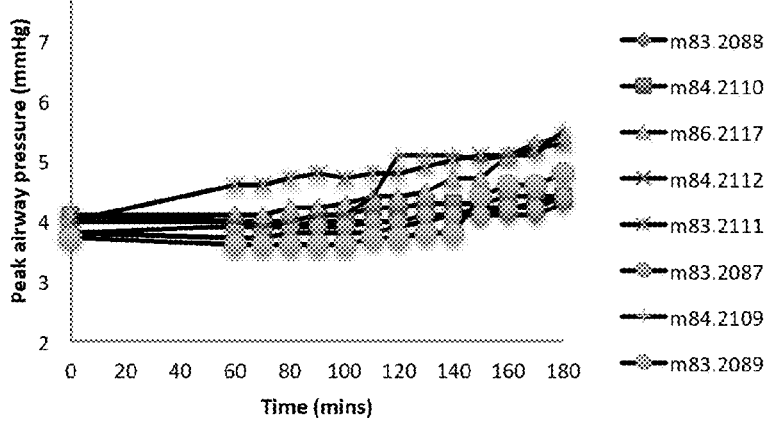

FIG. 4 shows peak airway pressures measured at regular intervals of ten minutes of all lungs perfused. In lungs perfused with the 4% PM70 solution pressure rose progressively, beginning approximately after 60 minutes or more of ex vivo perfusion. All six of these lungs developed overt oedema before completion of the three hour protocol (FIG. 4A and Table 3). When perfused with the 6% PM70 solution (to control for the effects of the small increase in osmotic pressure observed in the 4% PM70+3.25% PM400 solution), the rate of increase in peak airway pressure was somewhat slower than in lungs perfused with the 4% PM70 solution (FIG. 4B). Nonetheless, all of these lungs also developed oedema before completion of the three hour perfusion protocol (Table 3). In contrast, only a small increase in peak airway pressure was observed in lungs perfused with the 4% PM70+3.25% PM400 solution and all of the lung preparations completed the three hour protocol without the development of oedema (FIG. 4C and Table 3).

Figure 5:
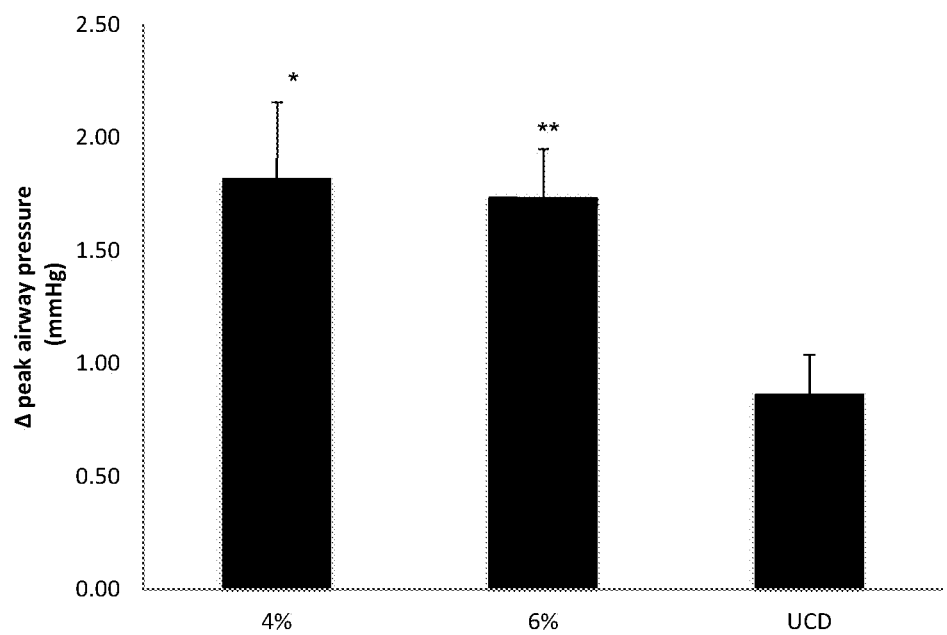
FIG. 5. Mean (±SEM) change in peak airway pressure between peak airway pressures recorded at start of each experiment and peak airway pressures recorded at the end of each experiment in lungs perfused with 4% PM70, 6% PM70 and UCD solution. * indicates significant difference ($P<0.05$, t-test post hoc Holms step down) vs peak airway pressures in UCD solution group. ** indicates significant difference ($P<0.01$, t-test post hoc Holms step down) vs peak airway pressures in UCD solution group. n=6-8 per group.

The frequency of oedema occurrence when lungs were perfused with the UCD Solution (4% PM70+3.25% PM400) was zero, significantly lower than that when either of the other two solutions was used (Table 3). In keeping with this, the mean increase in peak airway pressure at the end of the perfusion period was significantly lower in the lungs perfused with 4% PM70+3.25% PM400 than in either of the other two groups (FIG. 5).

Figure 6:
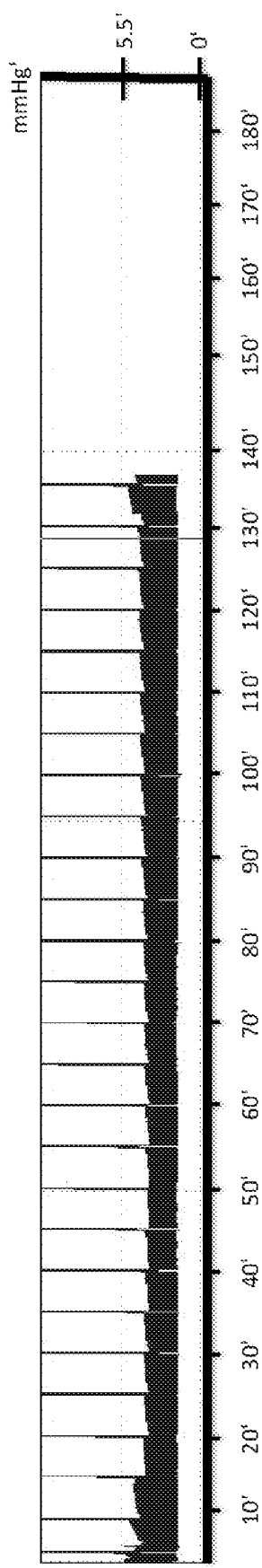
FIG. 6. Airway pressures over the course of ex vivo lung perfusion in a sample lung perfused with 4% PM70+0.1% Alginic acid in PBS.

Lungs perfused with alginate solution, with a viscosity of approximately 2.5 relative to dH$_2$O, showed stable airway pressures for a period exceeding two hours (FIG. 6), a period that exceeded the stable period of the lungs perfused with standard solutions (4% Ficoll PM70).

Figure 7:
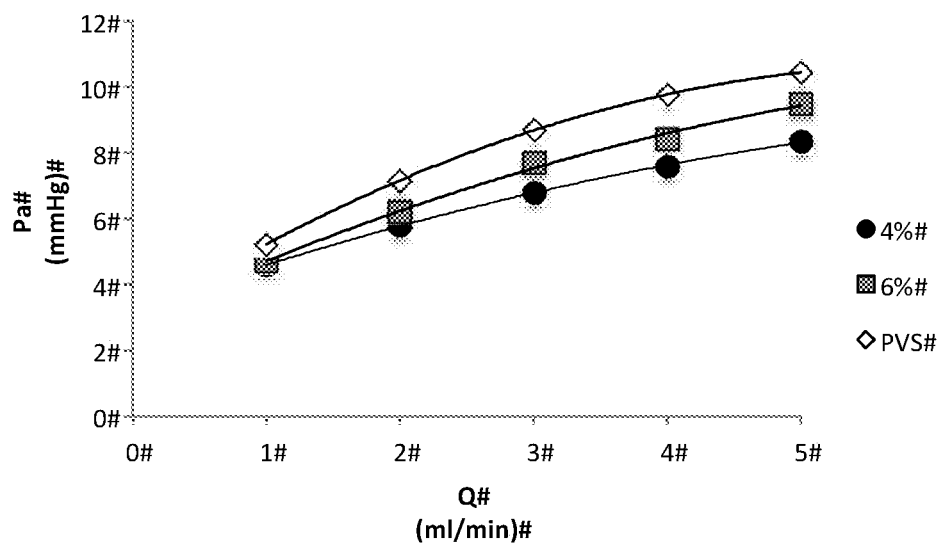
FIG. 7. Representative pressure (Pa): flow (Q) curve in three separate, isolated ex vivo lungs perfused with 4%, 6% or UCD solution respectively.
Figure 8:
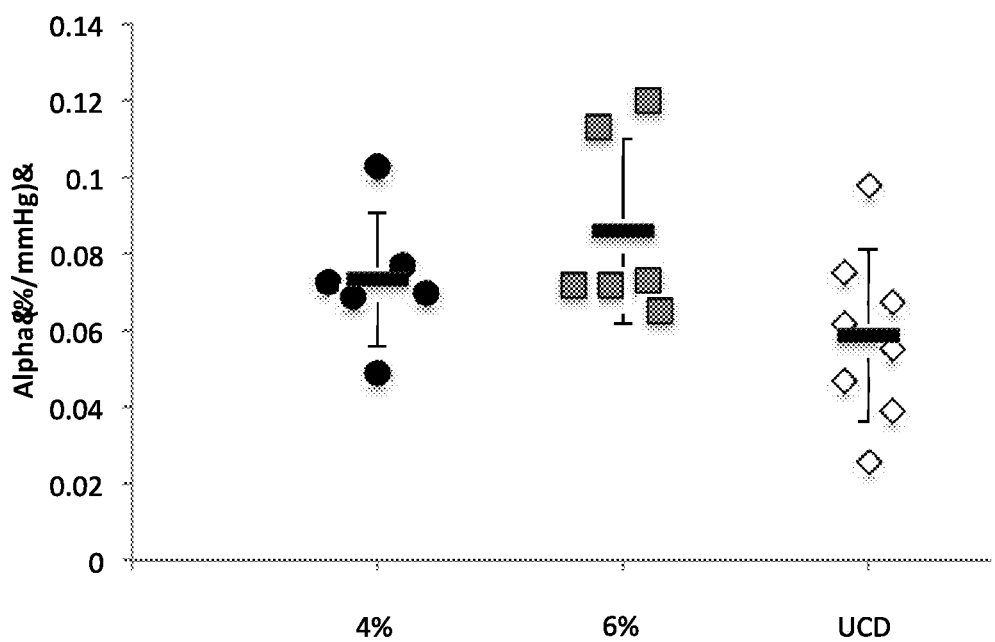
FIG. 8. Mean (±SD) values of Alpha estimated from the pressure-flow curve generated in each ex vivo mouse lung perfused with 4%, 6% or UCD solution. N=6-8 per group. Each point represents the result from a single lung.

FIG. 7 shows the relationship between perfusion pressure and flow in three separate lungs, each perfused with one of the three different solutions. Each lung shows the curvilinear relationship between pressure and flow that is characteristic of the normal pulmonary circulation. The curvilinear nature of this curve arises because of the highly distensible nature of the normal pulmonary circulation, which is characterised by the value alpha, derived using the Linehan model. The lung perfused with the UCD solution (4% PM70+3.25% PM400) had the highest pressure at each flow rate and the most marked curvilinearity. There was no significant alteration of alpha with the changing viscosity of the three different perfusion solutions (FIG. 8).

Figure 9:
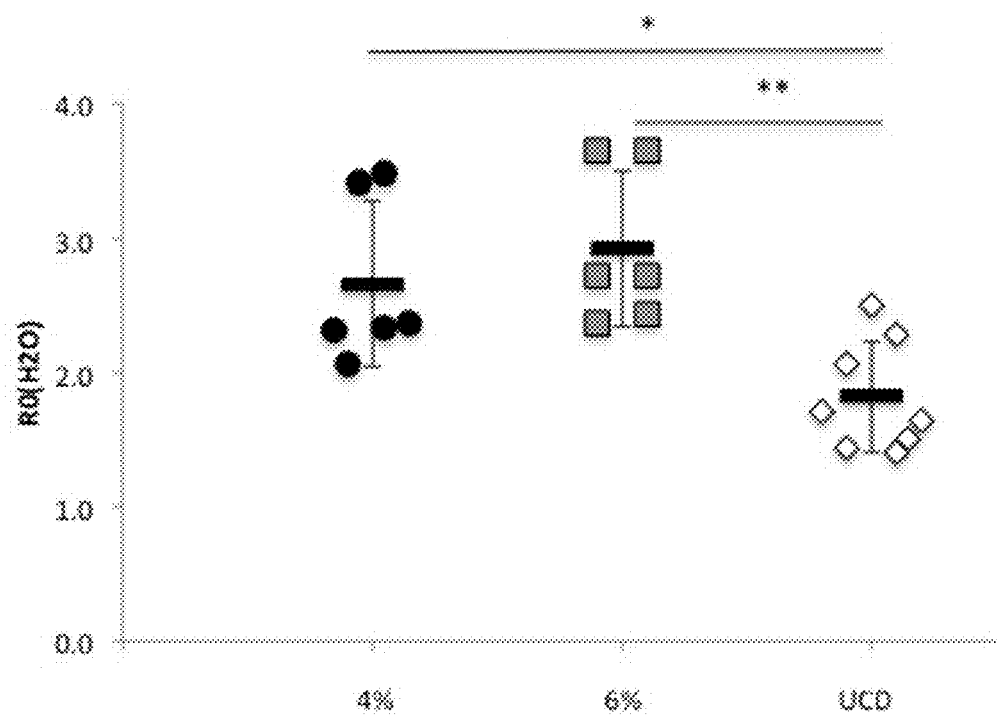
FIG. 9. Mean (±SD) values of R0($H_2O$) estimated from the pressure-flow curve in each ex vivo mouse lung perfused with 4%, 6% or UCD solution. Each point represents the result from a single lung. * and ** indicate significant difference (P<0.05 and P<0.01 respectively, t-test with Holms-Sidak step-down correction) between indicated groups. N=6-8 per group.

R0 is the value of the resistance of the pulmonary circulation to perfusate flow at a flow rate of zero and is therefore a virtual value. It depends upon the structure of the pulmonary vascular bed, the vasoconstrictor tone and the viscosity of the perfusing solution. From R0 a value, R0(H2O), was calculated for each lung preparation, which was the value of R0 that would have been obtained if the lung had been perfused with a solution whose viscosity equalled that of water. Calculation of R0(H2O) allows one to compare the resistance of the lungs independent of the viscosity of the perfusion solution. This value was significantly reduced in lungs (FIG. 9) perfused with the UCD solution (4% PM70+ 3.25% PM400), whereas it was closely similar in the two groups of lungs perfused with the two low viscosity solutions (4% PM70 and 6% PM70). Given the duration of these experiments, no structural changes in the pulmonary vascular bed can have occurred. Thus, these data are compatible with an action of the UCD solution to reduce the pulmonary vascular resistance by an acute vasodilator effect.

Figure 10:
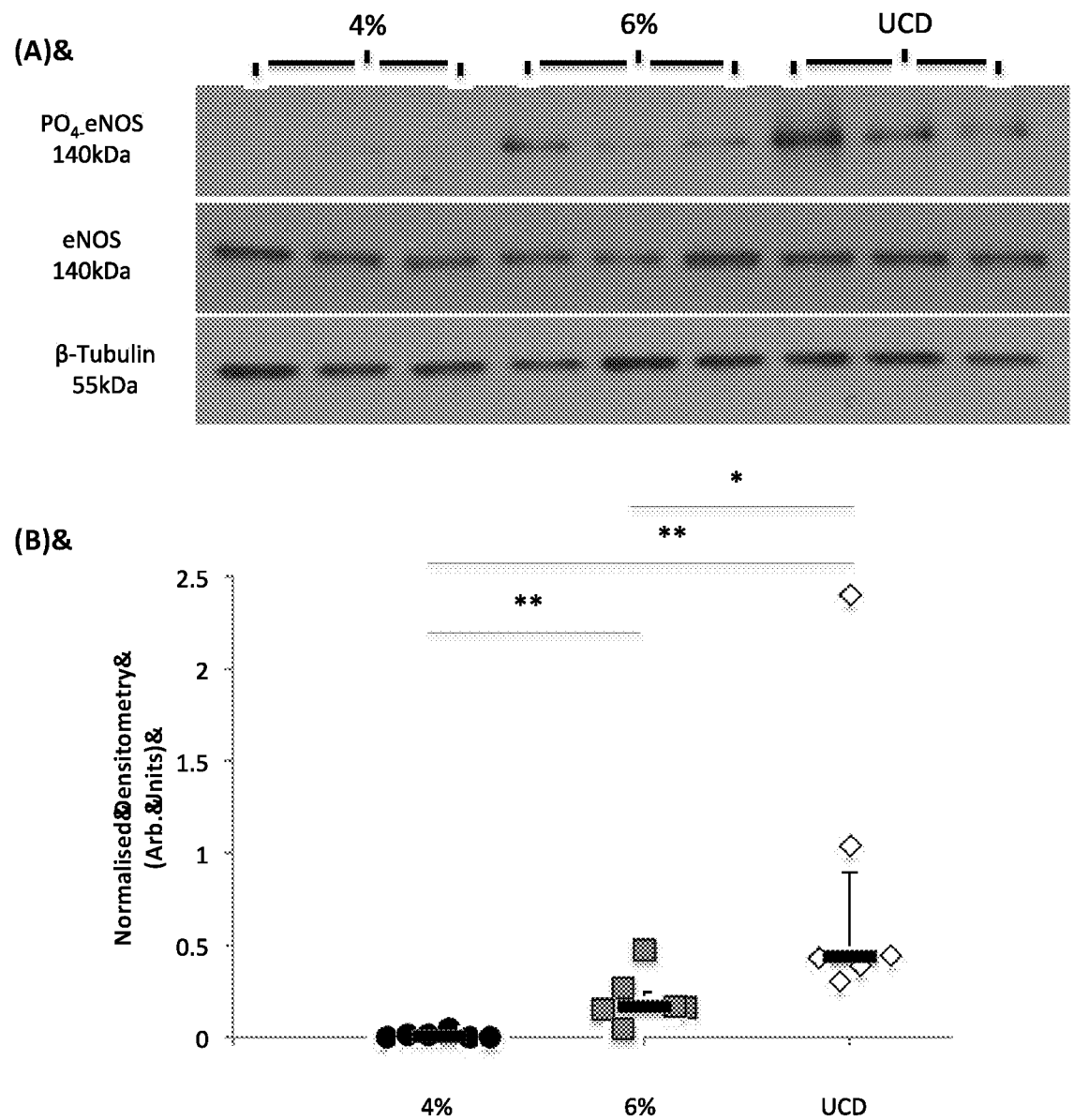
FIG. 10. (A) Representative western blot showing PO4-eNOS (s1177), total eNOS and β-tubulin expression in lysate from mouse lungs perfused with 4%, 6% or UCD solution. (B) Median (±IQR) densitometric analysis of PO4-eNOS expression normalised to β-tubulin in mouse lung lysate following perfusion with 4%, 6% and UCD solution. * and ** indicate significant difference (P<0.05 and P<0.01 respectively, Mann Whitney U with Holms-Sidak step-down correction) between indicated groups. N=6 per group.

To demonstrate directly that solutions of increasing viscosity had acted to increase shear stress across the vascular endothelium, the extent of phosphorylation of eNOS at serine1177 (PO4-eNOS), a known shear stress effect in the endothelium, was examined. The UCD solution caused a markedly greater eNOS phosphorylation (FIG. 10) than either of the other two solutions, demonstrating that it caused greater shear stress. Although the 6% PM70 solution caused a small increase in eNOS phosphorylation, compatible with the small increase in viscosity of this solution compared to the 4% PM70 solution, this was markedly less than that induced by the UCD solution.

Figure 11:
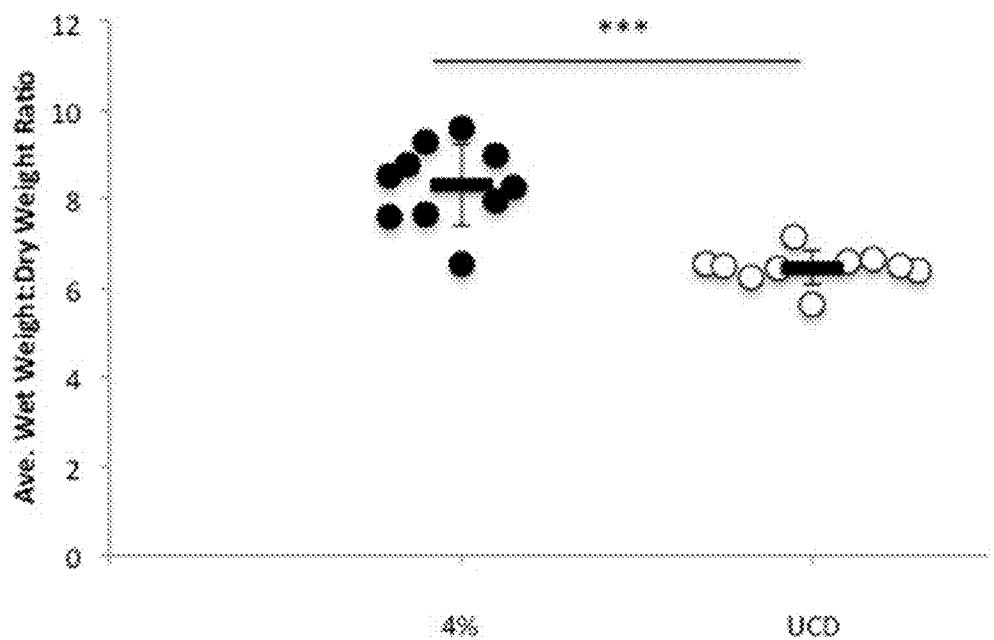
FIG. 11. Mean (±SD) Wet Weight: Dry Weight ratio in ex vivo mouse lungs perfused with 4% or UCD solution. *** indicates significant difference (P<0.001, t-test) between groups. N=10 per group.
Figure 12:
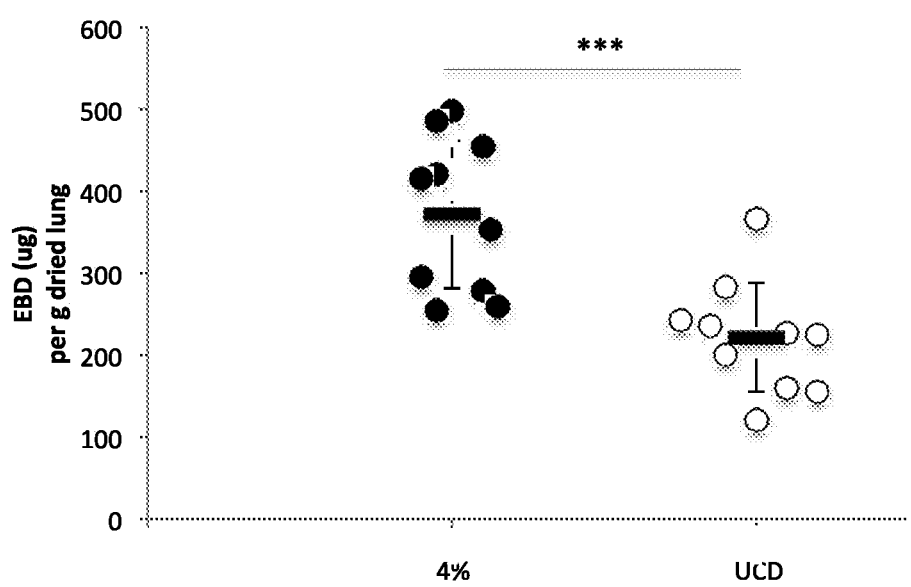
FIG. 12. Mean (±SD) Evans Blue Dye (EBD) concentration (μg) per gram (g) of dried lung tissue in ex vivo mouse lungs perfused with 4% or UCD solution. *** indicates significant difference (P<0.001, t-test) between groups. N=10 per group.

In a further series of experiments, the Applicant sought to confirm that the increased airway pressure observed in the first series of experiments reflected the development of pulmonary oedema, and that the maintenance of low airway pressure in lungs perfused with UCD solution represented protection from this accumulation of extravascular fluid. In this series, the duration of perfusion of each lung perfused with 4% PM70 (until oedema occurred) was matched in a subsequent isolated lung preparation perfused with UCD solution in order to control for any potential time dependent effects. Median (±IQR) experimental duration was 114 mins (±58). Wet weight to dry weight ratio was substantially lower in lungs perfused with the UCD solution compared to lungs perfused for identical periods of time with 4% PM70 (FIG. 11). In addition leak of Evans Blue-labelled albumin was measured in these lungs and found that this was also substantially reduced in lungs perfused with UCD solution compared to those perfused with 4% PM70 (FIG. 12). These data show that leak of the large molecule albumin across the endothelium was reduced by the high viscosity UCD solution. Thus, the UCD solution restored the ability of the vascular endothelium to retain large, physiologically important molecules within the vascular space, in addition to preventing leak of water and low molecular weight solutes.

TABLE 1

Summary of features of previously described lung preservation and reconditioning solutions

|  | EC | UW | HTK | CEL | PER | PAP | PLEG | Steen |
|---|---|---|---|---|---|---|---|---|
| Na$^+$ (mmol/l) | 10 | 25 | 15 | 100 | 138 | 115 | 120 | 110 |
| K$^+$ (mmol/l) | 115 | 120 | 10 | 15 | 6 | 3 | 16 | 7 |
| Impermeant (mmol/l) | Gluc(35) | LactoB (100) Raffinose (30) | Mann (30) | LactoB (80) Mann (60) | Gluc (5) | Mann (?) | — | Gluc (10) |
| Colloid Oncotic % (mol wt) | — | HES 5% (250 kDa) | — | — | Dex 5% (40 kDa) | Alb | — | Alb 7% Dex 0.5% (40 kDa) |
| Buffer | Phos, Bicarb | Phos | Histidine | Histidine | Phos | — | Bicarb | Bicard |
| Anti-oxidant* | — | Allop GSH | Trp | GSH | — | — | — | — |
| Osmolarity (mOsm/l) | 406 | 330 | 310 | 320 | 292 | 440 | 304 | 290 |
| Relative Viscosity | NA | 4.8 | 1.8 | 1.3 | 2.2 | NA | 1.15 | 1.3$^+$ |

EC, EuroCollins; UW, University of Wisconsin; HTK, histidine-tryptophan-ketoglutarate; CEL, Celsior; PER, Perfadex; PAP, Papworth; PLEG, Plegisol; Na$^+$, Sodium; K$^+$, Potassium; Mw, molecular weight; LactoB, lactobionate; HES, hydroxyethyl starch; Phos, phosphate; Bicarb, bicarbonate; GSH, gluthione; AlloP, allopurinol; NA, information not available,
*Mannitol has anti-oxidant properties but is not listed again here where it is already noted as an impermeant molecule.
$^+$Estimate from ex vivo Perfusion

TABLE 2

Composition of isolated lung perfusion solutions

| Solution | 1 | 2 | X |
|---|---|---|---|
| Salts and buffers | DMEM | DMEM | DMEM |
| Ficoll PM70 (g/100 ml) | 4 | 6 | 4 |
| Ficoll PM400 (g/100 ml) | 0 | 0 | 3.25 |
| Osmolality (mOsm/l) | 326 | 331 | 331 |
| Relative viscosity | 1.5 | 1.8 | 2.5 |

TABLE 3

Frequency of oedema development in ex vivo lungs perfused with three different lung perfusates

| Perfusate | 4% PM70 (n = 6) | 6% PM70 (n = 6) | 4% PM70 + 3.25% PM400 (n = 8) |
|---|---|---|---|
| Number of oedematous lungs | 6 | 6 | 0** |

**indicates significantly different from the other two groups (P < 0.01, Chi-square test, post hoc Holms step-down).

TABLE 4

Components of Sigma Aldrich Dulbecco's Modified Eagles's Medium (DMEM D6046)

| Inorganic Salts | g/L | Amino Acids | g/L |
|---|---|---|---|
| CaCL$_2$ | 0.2 | L-Arginine.HCL | 0.084 |
| Fe(NO$_3$)$_3$•9H$_2$O | 0.0001 | L-Cysteine•$_2$HCL | 0.0626 |
| MgSO$_4$ | 0.9767 | L-Glutamine | 0.584 |
| KCL | 0.4 | Glycine | 0.03 |
| NaHCO$_3$ | 3.7 | L-Histidine•HCL•H$_2$O | 0.042 |
| NaCL | 6.4 | L-Isoleucine | 0.105 |
| NaH$_2$PO$_4$ | 0.109 | L-Leucine | 0.105 |
|  |  | L-Lysine•HCL | 0.146 |
| Vitamins |  | L-Methionine | 0.03 |
| Choline Chloride | 0.004 | L-Phenylalanine | 0.066 |
| Folic Acid | 0.004 | L-Serine | 0.042 |
| Myo-Inositol | 0.0072 | L-Threonine | 0.095 |
| Niacinamide | 0.004 | L-Tryptophan | 0.016 |
| D-Pantothenic Acid•½Ca | 0.004 | L-Tyrosine•$_2$Na•2H2O | 0.10379 |
|  |  | L-Valine | 0.094 |
| Pyridoxal•HCL | 0.00404 |  |  |
| Riboflavin | 0.0004 |  |  |
| Thiamine•HCL | 0.004 |  |  |
| Other |  |  |  |
| D-Glucose | 1.0 |  |  |
| Phenol Red•Na | 0.0159 |  |  |
| Pyruvic acid•Na | 0.11 |  |  |

REFERENCES

BEVAN, H. S., SLATER, S. C., CLARKE, H., CAHILL, P. A., MATHIESON, P. W., WELSH, G. I. & SATCHELL, S. C. (2011) Acute laminar shear stress reversibly increases human glomerular endothelial cell permeability via activation of endothelial nitric oxide synthase. *Am J Physiol Renal Physiol,* 301, F733-42.

CABRALES, P., INTAGLIETTA, M. & TSAI, A. G. (2005a) Increase plasma viscosity sustains microcirculation after resuscitation from hemorrhagic shock and continuous bleeding. *Shock,* 23, 549-55.

CABRALES, P., TSAI, A. G. & INTAGLIETTA, M. (2005b) Alginate plasma expander maintains perfusion and plasma viscosity during extreme hemodilution. *Am J Physiol Heart Circ Physiol,* 288, H1708-16.

CADOGAN, E., HOPKINS, N., GILES, S., BANNIGAN, J. G., MOYNIHAN, J. & MCLOUGHLIN, P. (1999) Enhanced expression of inducible nitric oxide synthase without vasodilator effect in chronically infected lungs. *The American journal of physiology,* 277, L616-27.

CAHILL, E., COSTELLO, C. M., ROWAN, S. C., HARKIN, S., HOWELL, K., LEONARD, M. O., SOUTHWOOD, M., CUMMINS, E. P., FITZPATRICK, S. F., TAYLOR, C. T., MORRELL, N. W., MARTIN, F. & MCLOUGHLIN, P. (2012a) Gremlin plays a key role in the pathogenesis of pulmonary hypertension. *Circulation,* 125, 920-30.

CAHILL, E., ROWAN, S. C., SANDS, M., BANAHAN, M., RYAN, D., HOWELL, K. & MCLOUGHLIN, P. (2012b) The pathophysiological basis of chronic hypoxic pulmonary hypertension in the mouse: vasoconstrictor and structural mechanisms contribute equally. *Exp Physiol,* 97, 796-806.

COOKE, J. P., ROSSITCH, E., JR., ANDON, N. A., LOSCALZO, J. & DZAU, V. J. (1991) Flow activates an endothelial potassium channel to release an endogenous nitrovasodilator. *The Journal of clinical investigation,* 88, 1663-71.

COOKE, J. P., STAMLER, J., ANDON, N., DAVIES, P. F., MCKINLEY, G. & LOSCALZO, J. (1990) Flow stimulates endothelial cells to release a nitrovasodilator that is potentiated by reduced thiol. *The American journal of physiology*, 259, H804-12.

CYPEL, M., YEUNG, J. C., LIU, M., ANRAKU, M., CHEN, F., KAROLAK, W., SATO, M., LARATTA, J., AZAD, S., MADONIK, M., CHOW, C. W., CHAPARRO, C., HUTCHEON, M., SINGER, L. G., SLUTSKY, A. S., YASUFUKU, K., DE PERROT, M., PIERRE, A. F., WADDELL, T. K. & KESHAVJEE, S. (2011) Normothermic ex vivo lung perfusion in clinical lung transplantation. *N Engl J Med*, 364, 1431-40.

FAHRAEUS, R. & LINDQVIST, T. (1931) The viscosity of blood in narrow capillary tubes. *American Journal of Physiology*, 96, 562-568.

FRANGOS, J. A., ESKIN, S. G., MCINTIRE, L. V. & IVES, C. L. (1985) Flow effects on prostacyclin production by cultured human endothelial cells. *Science*, 227, 1477-9.

GIANNATTASIO, C., PIPERNO, A., FAILLA, M., VERGANI, A. & MANCIA, G. (2002) Effects of hematocrit changes on flow-mediated and metabolic vasodilation in humans. *Hypertension*, 40, 74-7.

HYVELIN, J. M., HOWELL, K., NICHOL, A., COSTELLO, C. M., PRESTON, R. J. & MCLOUGHLIN, P. (2005) Inhibition of Rho-kinase attenuates hypoxia-induced angiogenesis in the pulmonary circulation. *Circ Res*, 97, 185-91.

INGEMANSSON, R., EYJOLFSSON, A., MARED, L., PIERRE, L., ALGOTSSON, L., EKMEHAG, B., GUSTAFSSON, R., JOHNSSON, P., KOUL, B., LINDSTEDT, S., LUHRS, C., SJOBERG, T. & STEEN, S. (2009) Clinical transplantation of initially rejected donor lungs after reconditioning ex vivo. *Ann Thorac Surg*, 87, 255-60.

KESTIN, J., SOKOLOV, M. & WAKEMAN, W. (1978) Viscosity of Liquid Water in the range −8 C to 150 C. *J Phys Chem Ref Data*, 7, 941-8.

KIM, M. H., HARRIS, N. R. & TARBELL, J. M. (2005) Regulation of capillary hydraulic conductivity in response to an acute change in shear. *Am J Physiol Heart Circ Physiol*, 289, H2126-35.

LINEHAN, J. H., HAWORTH, S. T., NELIN, L. D., KRENZ, G. S. & DAWSON, C. A. (1992) A simple distensible vessel model for interpreting pulmonary vascular pressure-flow curves. *J Appl Physiol (1985)*, 73, 987-94.

MELKUMYANTS, A. M., BALASHOV, S. A. & KHAYUTIN, V. M. (1989) Endothelium dependent control of arterial diameter by blood viscosity. *Cardiovascular research*, 23, 741-7.

MINOR, T., VOLLMAR, B., MENGER, M. D. & ISSELHARD, W. (1998) Cold preservation of the small intestine with the new Celsior-solution. First experimental results. *Transpl Int*, 11, 32-7.

OOI, H., CADOGAN, E., SWEENEY, M., HOWELL, K., O'REGAN, R. G. & MCLOUGHLIN, P. (2000) Chronic hypercapnia inhibits hypoxic pulmonary vascular remodeling. *Am J Physiol Heart Circ Physiol*, 278, H331-8.

PAN, S. (2009) Molecular mechanisms responsible for the atheroprotective effects of laminar shear stress. *Antioxid Redox Signal*, 11, 1669-82.

POHL, U., HERLAN, K., HUANG, A. & BASSENGE, E. (1991) EDRF-mediated shear-induced dilation opposes myogenic vasoconstriction in small rabbit arteries. *The American journal of physiology*, 261, H2016-23.

PUHL, G., OLSCHEWSKI, P., SCHONING, W., HUNOLD, G., LIESAUS, H. G., WINKLER, R., NEUMANN, U. P., SCHUBERT, T. E., SCHMITZ, V. & NEUHAUS, P. (2006) Low viscosity histidine-tryptophan-ketoglutarate graft flush improves subsequent extended cold storage in University of Wisconsin solution in an extracorporeal rat liver perfusion and rat liver transplantation model. *Liver Transpl*, 12, 1841-9.

SIRS, J. A. (1991) The flow of human blood through capillary tubes. *J Physiol*, 442, 569-83.

STEEN, S. (2007) Evaluation and preservation solution. Vitrolife Ab.

WALLINDER, A., RICKSTEN, S. E., HANSSON, C., RIISE, G. C., SILVERBORN, M., LIDEN, H., OLAUSSON, M. & DELLGREN, G. (2012) Transplantation of initially rejected donor lungs after ex vivo lung perfusion. *J Thorac Cardiovasc Surg*, 144, 1222-8.

WALLINDER, A., RICKSTEN, S. E., SILVERBORN, M., HANSSON, C., RIISE, G. C., LIDEN, H., JEPPSSON, A. & DELLGREN, G. (2014) Early results in transplantation of initially rejected donor lungs after ex vivo lung perfusion: a case-control study. *Eur J Cardiothorac Surg*, 45, 40-4; discussion 44-5.

WALSH, T. G., MURPHY, R. P., FITZPATRICK, P., ROCHFORT, K. D., GUINAN, A. F., MURPHY, A. & CUMMINS, P. M. (2011) Stabilization of brain microvascular endothelial barrier function by shear stress involves VE-cadherin signaling leading to modulation of pTyr-occludin levels. *J Cell Physiol*, 226, 3053-63.

WARBOYS, C. M., ERIC BERSON, R., MANN, G. E., PEARSON, J. D. & WEINBERG, P. D. (2010) Acute and chronic exposure to shear stress have opposite effects on endothelial permeability to macromolecules. *Am J Physiol Heart Circ Physiol*, 298, H1850-6.

WARNECKE, G., MORADIELLOS, J., TUDORACHE, I., KUHN, C., AVSAR, M., WIEGMANN, B., SOMMER, W., IUS, F., KUNZE, C., GOTTLIEB, J., VARELA, A. & HAVERICH, A. (2012) Normothermic perfusion of donor lungs for preservation and assessment with the Organ Care System Lung before bilateral transplantation: a pilot study of 12 patients. *Lancet*, 380, 1851-8.

What is claimed is:

1. An organ perfusion solution comprising: a base solution comprising a physiological mixture of electrolytes and buffers; and 3.5-5.5% w/v a first macromolecule having a molecular weight of 40-100 kDa and an amount of a second, high molecular weight, macromolecule having a molecular weight of 350-600 kDa to adjust the relative viscosity of the organ perfusion solution to 2.1-2.7.

2. The organ perfusion solution of claim 1, wherein the organ perfusion solution comprises an amount of a second, high molecular weight, macromolecule sufficient to adjust the relative viscosity of the solution to about 2.5.

3. The organ perfusion solution of claim 1, wherein the organ perfusion solution solution comprises an amount of a second, high molecular weight, macromolecule sufficient to adjust the relative viscosity of the solution to about 2.5 and in which the second, high molecular weight, macromolecule has a molecular weight of 350-450 kDa.

4. The organ perfusion solution of claim 1, wherein the second, high molecular weight, macromolecule is a branched polysaccharide-based polymer.

5. The organ perfusion solution of claim 1, wherein the second, high molecular weight, macromolecule is non-ionic.

6. The organ perfusion solution of claim 1, wherein the second, high molecular weight, macromolecule is a FICOLL PM400.

7. The organ perfusion solution of claim 1, wherein the second, high molecular weight, macromolecule is provided in an amount of 2-5% w/v.

8. The organ perfusion solution of claim 1, wherein the first macromolecule is a molecule having a molecular weight of 60-80 KDa.

9. The organ perfusion solution of claim 1, wherein the first macromolecule is a polysaccharide-based polymer.

10. The organ perfusion solution of claim 1, wherein the first macromolecule is non-ionic.

11. The organ perfusion solution of claim 1, wherein the first molecular weight macromolecule is a FICOLL PM70.

12. The organ perfusion solution of claim 1, wherein the first macromolecule has a molecular weight of 60-80 KDa; and the organ perfusion solution comprises 2-5% w/v of the second macromolecule.

13. A method of perfusing an organ ex vivo comprising a step of perfusing an organ perfusion solution of claim 1, through the organ.

14. An organ perfusion solution comprising a base solution comprising a physiological mixture of electrolytes and buffers; and 3.5-5.5% w/v FICOLL PM70, and an amount of FICOLL PM400 to adjust the relative viscosity of the organ perfusion solution to 2.1-2.7.

15. The method of claim 13, wherein the organ perfusion solution comprises an amount of a second, high molecular weight, macromolecule sufficient to adjust the relative viscosity of the organ perfusion solution to about 2.5.

16. The method of claim 13, wherein the organ perfusion solution comprises an amount of a second, high molecular weight, macromolecule sufficient to adjust the relative viscosity of the organ perfusion solution to about 2.5 and in which the second, high molecular weight, macromolecule has a molecular weight of 350-450 kDa.

17. The method of claim 13, wherein the first macromolecule has a molecular weight of 60-80 KDa; and the organ perfusion solution comprises 2-5% w/v of the second macromolecule.

18. A method of perfusing an organ ex vivo comprising a step of perfusing an organ perfusion solution of claim 14, through the organ.

19. The method of claim 13, wherein the organ is selected from a lung, a heart, a kidney and a liver.

* * * * *